United States Patent
Nishikawa

(10) Patent No.: US 6,763,254 B2
(45) Date of Patent: Jul. 13, 2004

(54) PORTABLE INFORMATION TERMINAL HAVING WIRELESS COMMUNICATION DEVICE

(75) Inventor: Kenji Nishikawa, Hyogo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 676 days.

(21) Appl. No.: 09/842,653

(22) Filed: Apr. 27, 2001

(65) Prior Publication Data

US 2002/0142735 A1 Oct. 3, 2002

(30) Foreign Application Priority Data

Mar. 30, 2001 (JP) .......................................... 2001-098665

(51) Int. Cl.[7] .................................................. H04B 1/38
(52) U.S. Cl. ..................................... 455/575.7; 343/702
(58) Field of Search ................................. 379/446, 449; 455/575.1, 575.7, 575.8, 550.1, 90.3, 347; 343/702

(56) References Cited

U.S. PATENT DOCUMENTS

| | | | |
|---|---|---|---|
| 5,949,379 A | * | 9/1999 | Yang ........................... 343/702 |
| 6,531,985 B1 | * | 3/2003 | Jones et al. .................. 343/702 |
| 6,538,606 B2 | * | 3/2003 | Quinn et al. ................. 343/702 |
| 2002/0013162 A1 | * | 1/2002 | Whitney ...................... 455/557 |
| 2002/0101378 A1 | * | 8/2002 | Quinn et al. ................. 343/702 |

* cited by examiner

*Primary Examiner*—Lee Nguyen
*Assistant Examiner*—Sanh D Phu
(74) *Attorney, Agent, or Firm*—Wenderoth, Lind & Ponack, L.L.P.

(57) ABSTRACT

In an information terminal, a coaxial cable connected a radio-circuit-board, which is often placed at a front section of a case, to an external antenna terminal or an antenna placed at a rear section of the case. The terminal having a simple structure prevents a clock signal from leaking to the coaxial cable from a CPU, so that an S/N ratio in receiving can be improved. A cable-groove recessed from a bottom to inside is provided. The coaxial cable between the radio circuit board and the external antenna terminal or the antenna runs through the cable groove, which is covered with a lid. Thus, a clock signal of the CPU can be shielded by the conductive case.

13 Claims, 5 Drawing Sheets

PORTABLE INFORMATION TERMINAL HAVING WIRELESS COMMUNICATION DEVICE

FIELD OF THE INVENTION

The present invention relates to a portable information terminal such as a notebook-sized personal computer, and particularly to the terminal having a circuit for wireless communication to an outside.

BACKGROUND OF THE INVENTION

Among personal computers (PC), a notebook-sized PC, which is portable and occupies a little space on a desk, has been widely used in these days. FIG. 5 is a lateral cross sectional view of a conventional notebook-sized PC. Lid 3 is mounted to the rear end of case 1 with hinge section 2 so that lid 3 can open until a certain angle with respect to case 1. A lock mechanism (not shown) prevents lid 3 from opening when the PC is hand carried.

Case 1 is made of metal, e.g., magnesium alloy, and formed by die-casting, or made of metal plate and formed by pressing. Thus, case 1 is conductive and shielded so that high-frequency components such as an inner clock will not leak to outside. A plurality of keys for inputting letters, numbers and marks are placed on case 1. On the rear part of case 1, input/output (I/O) terminal 5, e.g., a printer output terminal, is provided.

Inside of case 1, mother board 6, on which major circuits including CPU 7 of the PC are mounted, is placed. Lid 3 has liquid crystal display (LCD) 8 on the surface confronting an operator. Connecting wire 9 between mother board 6 and LCD 8 is located through hinge section 2.

In front of mother board 6, radio circuit board 10 is mounted in case 1 for communicating to an outside, e.g., a cellular phone, personal-handy-phone, wireless local area network (LAN). An end of coaxial cable 14 is connected to an antenna terminal of radio circuit board 10. Coaxial cable 14 is located in case 1 and connected to external antenna-connection-terminal 17, which is disposed at the rear section of case 1. Coaxial cable 18 from terminal 17 is located in hinge section 2 and lid 3, i.e., behind LCD 8, thereby connecting to antenna 19 which rises to the highest when lid 3 opens.

In such a conventional notebook-sized PC shown in FIG. 5, since the rear section of case 1 is crowded with I/O terminal 5 such as a printer-output-terminal and connecting wires 9 to LCD 8, mother board 6 mounting major circuits of the PC is generally placed at a rear part of case 1. Thus, radio circuit board 10 of a wireless communication device is obliged to locate at a front part of case 1.

Antenna 19 is disposed at the rear section of case 1, i.e., away from a human body, in order to avoid lowering sensitivity, and is coupled to a wireless communication device with coaxial cables 14, 18. Coaxial cables 14, 18 are located across case 1 from the wireless communication device disposed at the front section to antenna terminal 17 for outside as well as antenna 19 disposed at the rear section of case 1.

Coaxial cable 14 is located near CPU 7 mounted on mother board 6. A low level high-frequency signal is induced at antenna 19 and supplied to the input terminal of the antenna of radio circuit board 10 via coaxial cables 18, 14. According to this positional relation, a clock signal of CPU 7 interferes with this low level high-frequency signal and lowers its S/N ratio.

SUMMARY OF THE INVENTION

A portable information terminal having wireless communication device comprises the following elements:

A conductive case;

A radio circuit board having an antenna terminal and being placed at a front section in the case;

An external antenna terminal or an antenna placed at a rear section of the case;

A cable-leading-out hole disposed at the front section of the case;

A cable-leading-in hole disposed at the rear section of the case;

A cable-groove recessed from the surface into inside of the case, the groove running between the cable-leading-out hole and the cable-leading-in hole;

A coaxial cable connecting the antenna terminal to the external antenna terminal or the antenna; and A lid for covering the cable-leading-out hole, the cable-leading-in hole and the cable groove.

The coaxial cable connects the antenna terminal on the radio circuit board to the external antenna terminal or the antenna through the cable-leading-out hole, cable groove, and cable-leading-in hole. The coaxial cable is free from interference with other circuits in the case, in particular with the clock in a CPU on a mother board, so that the information terminal can receive a radio signal at a high S/N ratio.

DESCRIPTION OF THE PREFERRED EMBODIMENTS

Exemplary Embodiment 1

Figure 1:
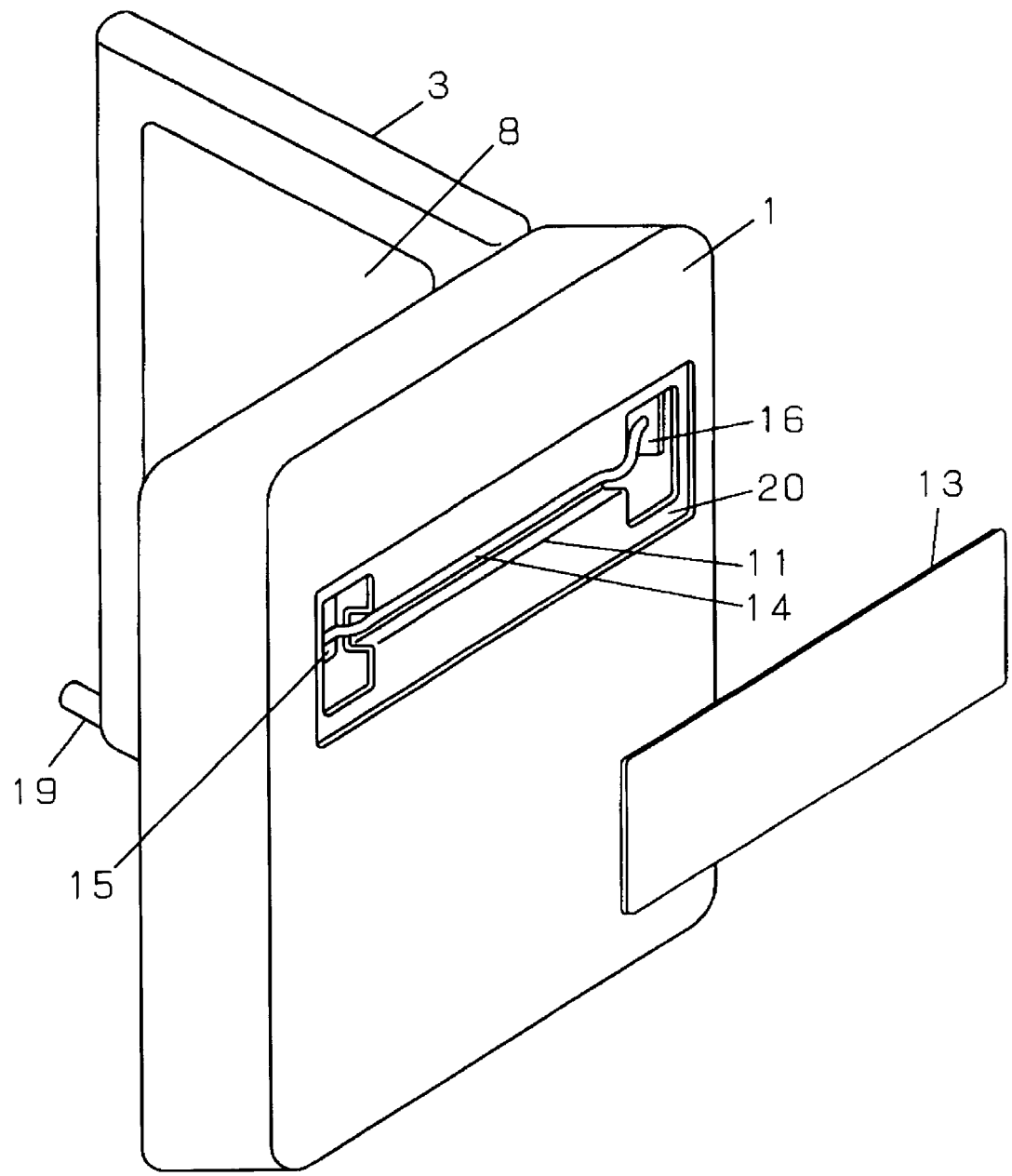
FIG. 1 is a perspective view of a notebook-sized PC viewed from a bottom side in accordance with a first exemplary embodiment of the present invention.
Figure 2:
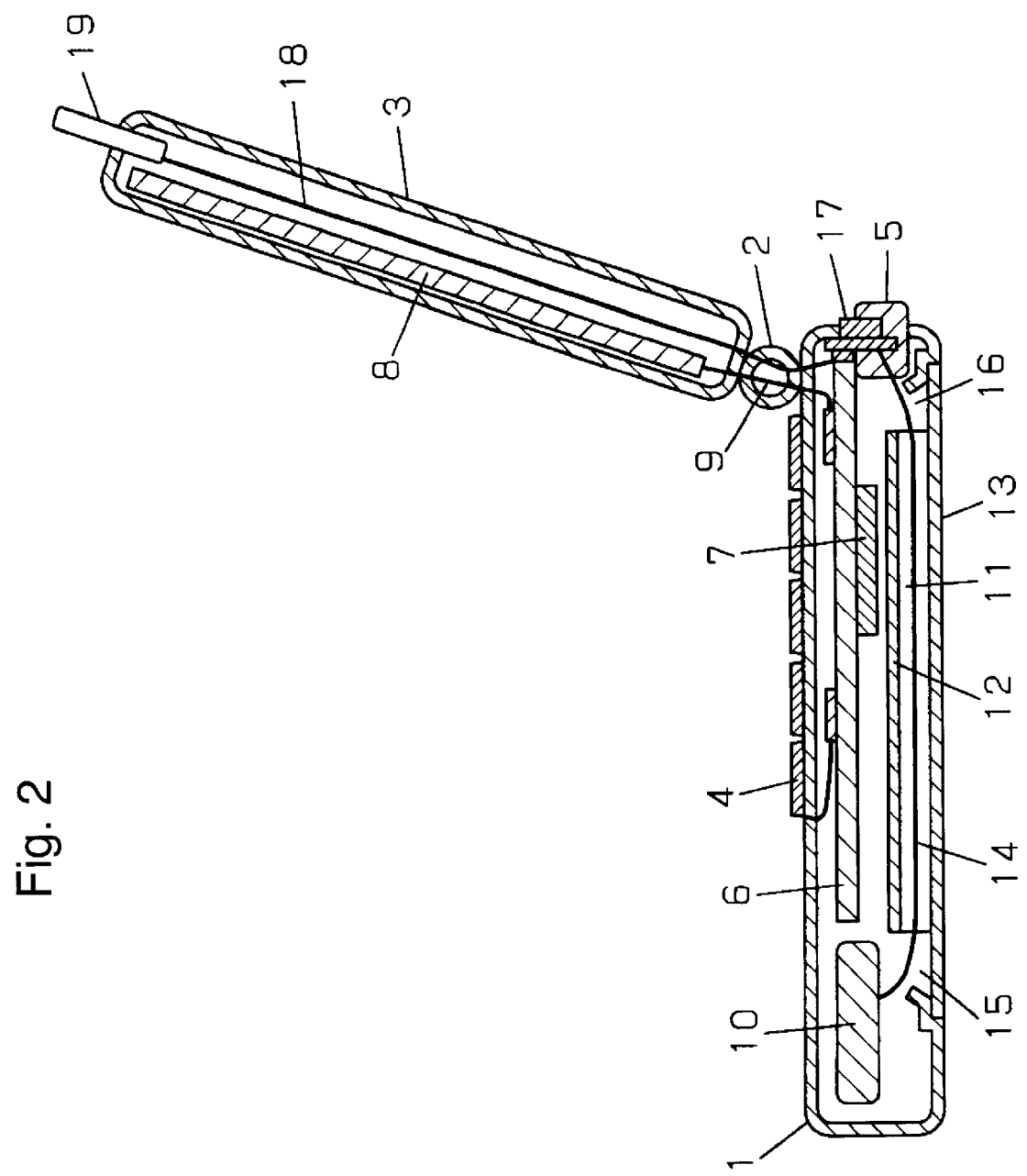
FIG. 2 is a cross section of the note-sized PC viewed from a lateral side in accordance with the first exemplary embodiment of the present invention.
Figure 3:
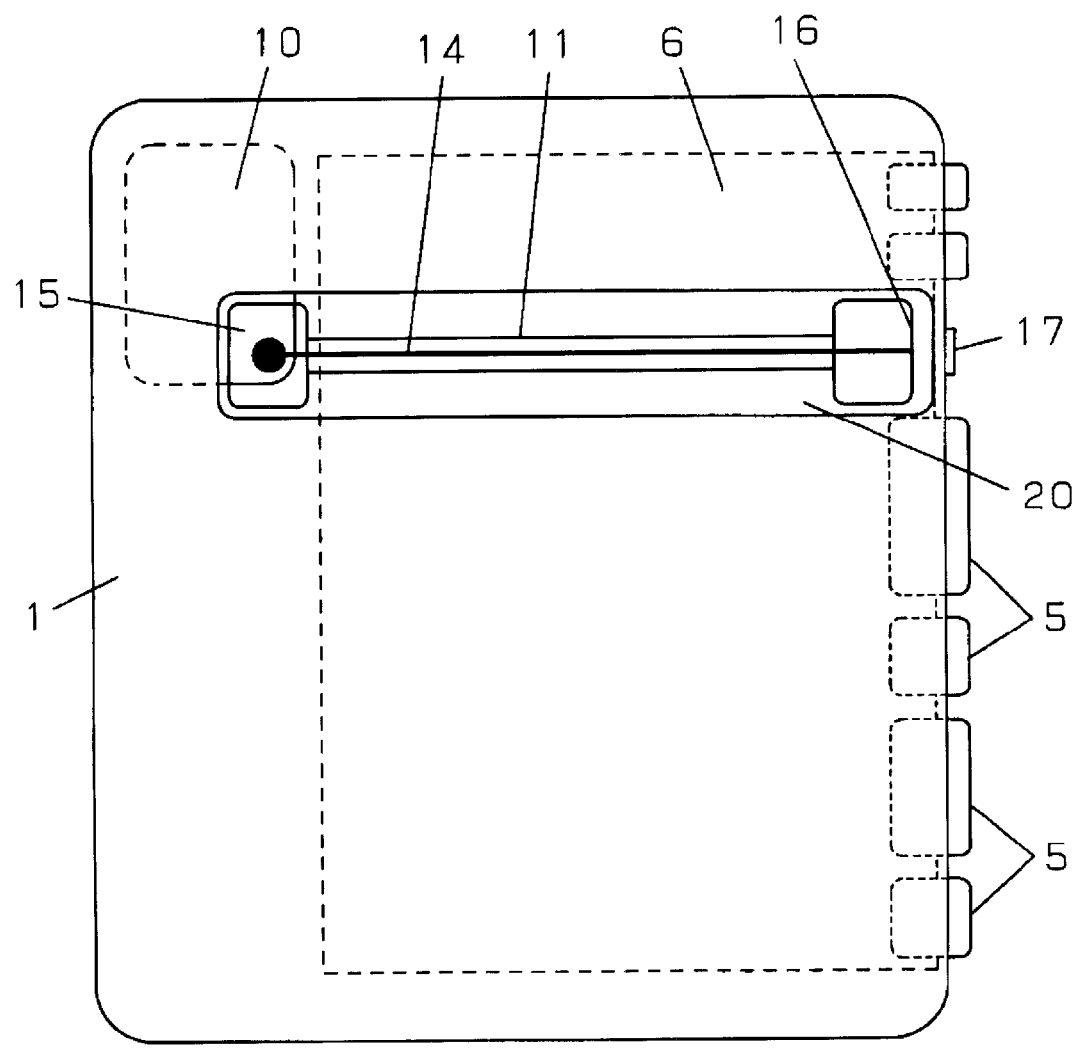
FIG. 3 is a bottom view of the PC in accordance with the first embodiment of the present invention.
Figure 5:
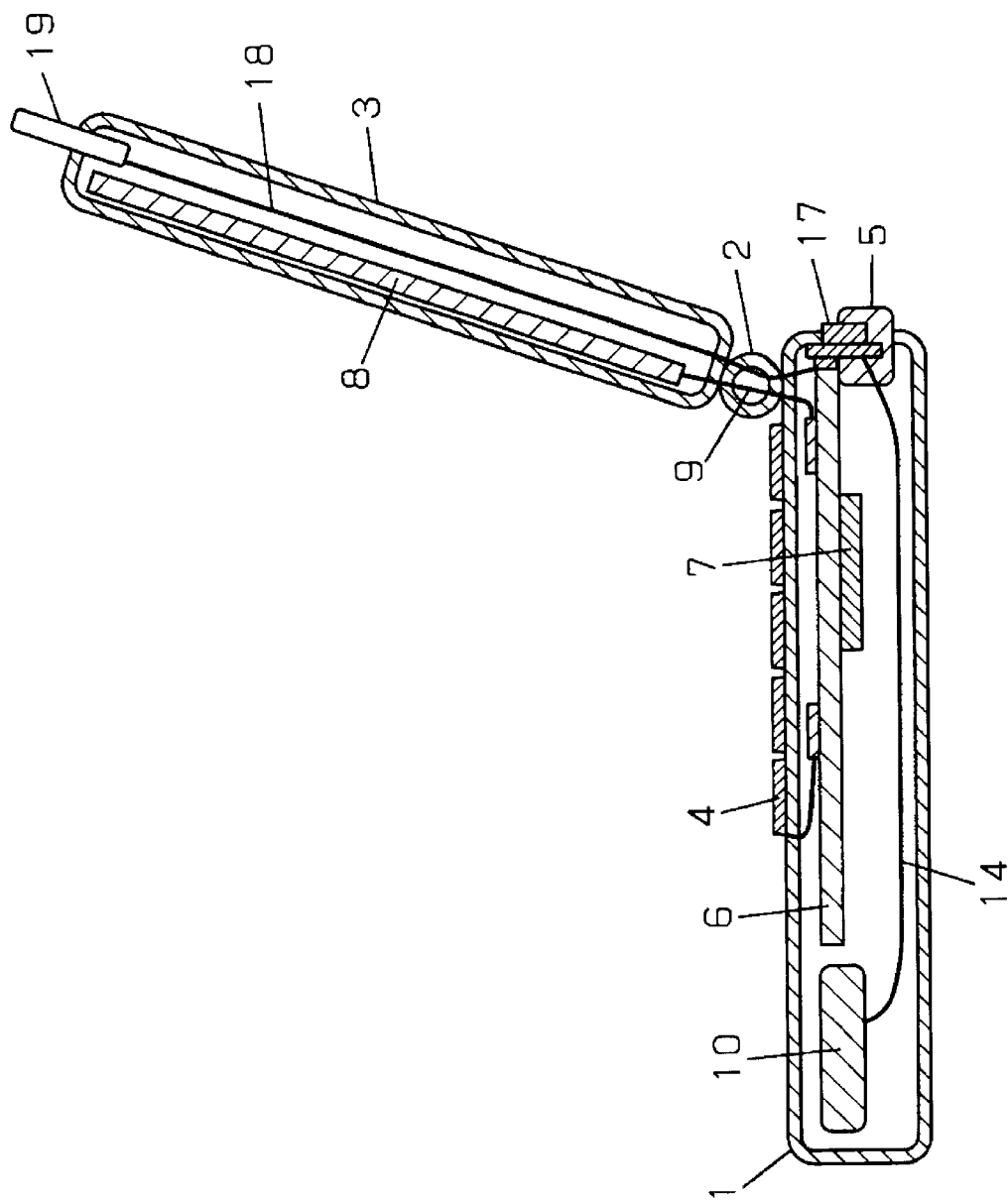
FIG. 5 is a cross section of a conventional note-sized PC viewed from a lateral side.

The first exemplary embodiment of the present invention is demonstrated hereinafter with reference to the accompanying drawings. FIG. 1 is a perspective view of a notebook-sized PC viewed from a bottom side in accordance with a first exemplary embodiment of the present invention. FIG. 2 is a cross section of the PC viewed from a lateral side. FIG. 3 is a bottom view of the PC. The same elements as those in a conventional terminal shown in FIG. 5 bear the same reference marks as in FIG. 5, and the descriptions thereof are omitted. A different point from the conventional terminal is that a long and narrow cable groove 11 is provided on the bottom of case 1. Cable groove 11 is recessed on the bottom face. At the front and the rear of cable groove 11, cable-leading-out hole 15 and cable-leading-in hole 16 are punched, respectively. Coaxial cable 14 from the antenna terminal of radio circuit board 10 in the case to hole 16 via hole 15 is located through cable groove 11 into case 1 again via hole 16. Coaxial cable 14 is connected to external antenna terminal 17. Terminal 17 is coupled to antenna 19 with coaxial cable 18. Antenna 19 is not necessary if external antenna terminal 17 is available, or terminal 17 is not necessary if antenna 19 is available. Cable groove 11 has lid 13 mounted thereon with a screw or a clasp (not shown.) Lid 13 is made of a plastic board; however when a shielding effect is required, metal alloy is provided for the plastic board, thereby giving conductivity thereto. The lid may be made of metal plate. Periphery of cable groove 11 is sized slightly larger than lid 13, and recess 20, of which depth is the same as the thickness of lid 3, is provided. When lid 13 is closed, it covers cable groove 11, cable-leading-out hole 15 and cable-leading-in hole 16.

Then, an operation of the information terminal will be described. When the terminal is in use, lid 3 is opened and antenna 19 is raised highly from the desktop. Antenna 19 is coupled to external-antenna-coupling terminal 17 with coaxial cable 18. Weak radio wave received by antenna 19 is supplied to the antenna terminal of radio circuit board 10 via coaxial cable 14. When an external antenna (not shown) is coupled to external-antenna-coupling terminal 17, coaxial cables 18 is disconnected from coaxial cable 14, and the external antenna is coupled to coaxial cable 14. Since coaxial cable 14 is located through cable groove 11, cable 14 is shut off from the clock signal of CPU 7 on mother board 6 by cable-groove bottom 12 made of conductive material. Therefore, this information terminal can obtain a higher S/N ratio than a conventional information terminal.

If lid 13 is made of conductive material, a high frequency signal slightly leaked from coaxial cable 14 can be shielded particularly in transmitting.

The material of case 1 is not limited to die-cast metal alloy or pressed metal plate, but case 1 can be formed by plastic with metal evaporation provided inside thereof, or formed by plating a sheet of metal plate. Case 1 can be also formed of plastic material mixed with metallic powder as filler. Lid 13 is not always made of conductive material, and it can be formed of the same material as case 1.

As discussed above, according to the first embodiment, coaxial cable 14 connects radio circuit board 10 to external antenna terminal 17 or antenna 19. This cable 14 runs through cable groove 11, so that the conductive case is sandwiched by cable 14 and board 10. Thus, the information terminal can receive a signal from the antenna at an excellent S/N ratio through coaxial cable 14 free from interference with clock signals from CPU 7 on mother board 6.

Exemplary Embodiment 2

Figure 4:
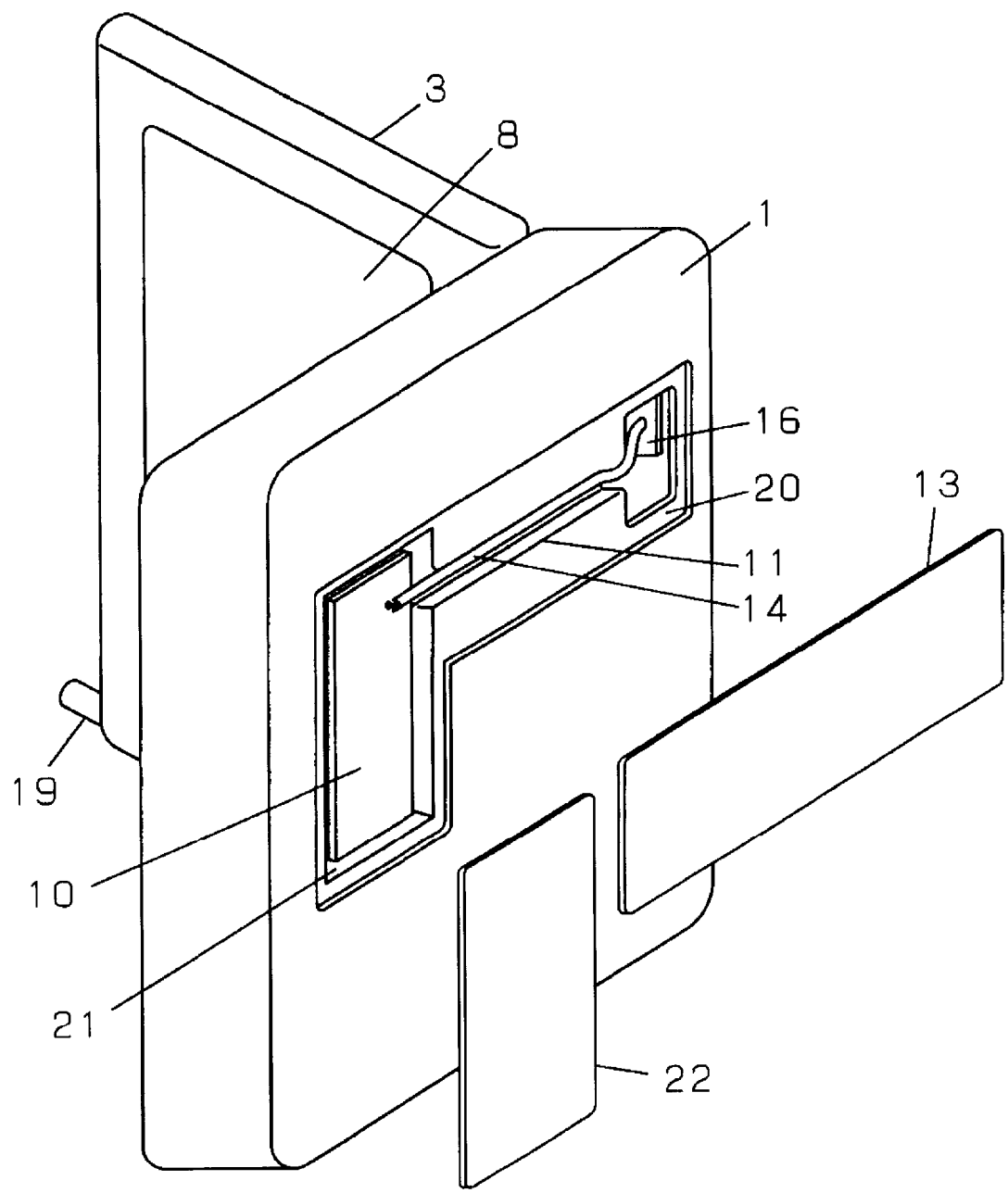
FIG. 4 is a perspective view of a notebook-sized PC viewed from a bottom side in accordance with a second exemplary embodiment of the present invention.

FIG. 4 is a perspective view of a notebook-sized PC viewed from a bottom side in accordance with the second exemplary embodiment of the present invention. In addition to cable groove 11 and recess 20 around the groove, another recess 21 for mounting a radio circuit board 10 from the outside and lid 22 for covering another recess 21 are provided. Lid 22 is, similarly to lid 13, mounted with a screw or clasp, and thus made detachable. Recess 21 enables the radio circuit board to be mounted into a notebook-sized PC, which has not be equipped with radio-circuit-board 10, at a service station or by a user for himself/herself.

Lid 22 is removed, then radio-circuit-board 10 is mounted. Coaxial cable 14 extending from board 10 is coupled to external-antenna-terminal 17. Terminal 17 and cable 14 may be coupled beforehand an expected additional board 10. Board 10 may be coupled with a connector. It is preferable that antenna 19 and coaxial cable 18 have been connected beforehand. Lids 13 and 22 are mounted, and then, the mounting of board 10 is completed. Lids 13 and 22 are shown in FIG. 4 as separated units, however, they can be unitarily formed.

As discussed above, according to the second embodiment, radio-circuit-board 10 can be installed to the PC at a service station or by a user with ease. At the installation, coaxial cable 14, for coupling board 10 to external antenna terminal 17 or antenna 19, runs through cable groove 11, so that the conductive case is located between cable 14 and board 10. Thus the information terminal can receive a signal from the antenna at an excellent S/N ratio through coaxial cable 14 free from interference with clock signals from CPU 7 on mother board 6.

In the above embodiments, the present invention is explained with the notebook-sized PC. However, the present invention is not limited to the PC, and it is applicable to a portable information terminal having a wireless communication device and having a similar structure to the PC.

What is claimed is:

1. A portable information terminal comprising:
   a conductive case in which a cable-leading-out hole is formed at a front section thereof, a cable-leading-in hole is formed at a rear section thereof, and a cable-groove is recessed from a surface thereof to an inside thereof is formed between the cable-leading-in hole and the cable-leading-out hole;
   a radio-circuit-board having an antenna terminal, said radio-circuit-board being disposed at the front section in said case;
   an external antenna terminal disposed at the rear section in said case;
   a cable for coupling said antenna terminal of said radio-circuit-board to said external antenna terminal via the cable-leading-out hole, the cable-groove, and the cable-leading-in hole; and
   a lid for covering the cable-leading-out hole, the cable-leading-in hole, and the cable-groove.

2. A portable information terminal comprising:
   a conductive case in which a cable-leading-out hole is formed at a front section thereof, a cable-leading-in hole is formed at a rear section thereof, and a cable-groove is recessed from a surface thereof to an inside thereof is formed between the cable-leading-in hole and the cable-leading-out hole;
   a radio-circuit-board having an antenna terminal, said radio-circuit board being disposed at the front section in said case;
   an antenna disposed at the rear section in said case;
   a cable for coupling said antenna terminal of said radio-circuit-board to said antenna via the cable-leading-out hole, the cable-groove, and the cable-leading-in hole; and
   a lid for covering the cable-leading-out hole, the cable-leading-in hole,
   and the cable-groove.

3. The portable information terminal of claim 1, wherein said lid is conductive.

4. A portable information terminal comprising:
   a conductive case in which a cable-leading-in hole is formed at a rear section thereof, a recess for accommodating a board is recessed from a surface thereof to an inside thereof, a cable groove is recessed between the recess and the cable-leading-in hole from the surface thereof to the inside thereof;
   an external antenna terminal disposed at a rear section of said case;
   a radio-circuit-board having an antenna, said radio-circuit-board being disposed in the recess;

a cable for coupling said antenna terminal to said external antenna terminal via the cable groove and the cable-leading-out hole; and a first lid for covering the cable groove and the cable-leading-in hole.

5. A portable information terminal comprising:

a conductive case in which a cable-leading-in hole is formed at a rear section thereof, a recess for accommodating a board is recessed from a surface thereof to an inside thereof, a cable groove is recessed between the recess and the cable-leading-in hole from the surface thereof to the inside thereof;

an antenna disposed at the rear section of said case;

a radio-circuit-board having an antenna, said radio-circuit-board being disposed in the recess;

a cable for coupling said antenna terminal to said antenna via the cable groove and the cable-leading-out hole; and a first lid for covering the cable groove and the cable-leading-in hole.

6. The portable information terminal of claim 4; wherein said first lid covers the recess, the cable groove, and the cable-leading-in hole.

7. The portable information terminal of claim 4; wherein said first lid is conductive.

8. The portable information terminal of claim 4 further comprising a second lid for covering the recess for accommodating the board.

9. The portable information terminal of claim 8, wherein said second lid is conductive.

10. The portable information terminal of claim 2, wherein said lid is conductive.

11. The portable information terminal of claim 5; wherein said first lid covers the recess, the cable groove, and the cable-leading-in hole.

12. The portable information terminal of claim 5; wherein said first lid is conductive.

13. The portable information terminal of claim 5 further comprising a second lid for covering the recess for accommodating the board.

* * * * *